(12) United States Patent
Shim et al.

(10) Patent No.: US 12,042,757 B2
(45) Date of Patent: Jul. 23, 2024

(54) LIGHT GUIDE PLATE HAVING AIR PERMEABILITY AND AIR PURIFYING FILTER INCLUDING THE SAME

(71) Applicant: LG CHEM, LTD., Seoul (KR)

(72) Inventors: Hong Shik Shim, Daejeon (KR); Byung Mook Kim, Daejeon (KR); Jeehyon Min, Daejeon (KR); Miyeon Oh, Daejeon (KR); Jinkyu Lee, Daejeon (KR); Mingoo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 674 days.

(21) Appl. No.: 17/282,102

(22) PCT Filed: Nov. 6, 2019

(86) PCT No.: PCT/KR2019/014994
§ 371 (c)(1),
(2) Date: Apr. 1, 2021

(87) PCT Pub. No.: WO2020/130341
PCT Pub. Date: Jun. 25, 2020

(65) Prior Publication Data
US 2021/0370214 A1    Dec. 2, 2021

(30) Foreign Application Priority Data

Dec. 20, 2018    (KR) .................. 10-2018-0166729

(51) Int. Cl.
*A61L 2/00*    (2006.01)
*B01D 39/00*    (2006.01)
(Continued)

(52) U.S. Cl.
CPC ......... *B01D 46/12* (2013.01); *B01D 46/0028* (2013.01); *B01D 46/0038* (2013.01);
(Continued)

(58) Field of Classification Search
CPC ... A61L 9/205; A61L 2209/12; B01D 53/007; B01D 46/0001; B01J 23/30; F24F 8/167
(Continued)

(56) References Cited

U.S. PATENT DOCUMENTS

2008/0142435 A1* 6/2008 Kawai ................. C02F 1/725
                                                                    362/617
2009/0279313 A1    11/2009 Teragawa
(Continued)

FOREIGN PATENT DOCUMENTS

CN            2657030 Y      11/2004
CN          204469537 U       7/2015
(Continued)

OTHER PUBLICATIONS

International Search Report issued for International Application No. PCT/KR2019/014994 on Mar. 27, 2020, 4 pages.
(Continued)

*Primary Examiner* — Monzer R Chorbaji
(74) *Attorney, Agent, or Firm* — ROTHWELL, FIGG, ERNST & MANBECK, P.C.

(57) ABSTRACT

The present disclosure relates to an air-permeable light guide plate and an air purifying filter including the same, wherein the air-permeable light guide plate according to an embodiment of the present disclosure includes a light source located on at least one side surface, and a flat type plate through which light generated from the light source passes, wherein light is emitted in a direction perpendicular to a flat plate of the flat type plate, and the flat type plate has a plurality of openings.

10 Claims, 14 Drawing Sheets

(51) Int. Cl.
*B01D 46/00* (2022.01)
*B01D 46/12* (2022.01)
*B01D 46/52* (2006.01)
*B01D 53/86* (2006.01)

(52) U.S. Cl.
CPC ......... *B01D 46/521* (2013.01); *B01D 53/86* (2013.01); *B01D 2255/20707* (2013.01); *B01D 2255/2092* (2013.01); *B01D 2255/802* (2013.01)

(58) Field of Classification Search
USPC .............................................. 422/24; 96/224
See application file for complete search history.

(56) References Cited

U.S. PATENT DOCUMENTS

| | | |
|---|---|---|
| 2011/0013382 A1 | 1/2011 | Numao |
| 2012/0075885 A1 | 3/2012 | Sampsell |
| 2012/0085927 A1 | 4/2012 | Maeng et al. |
| 2015/0036078 A1 | 2/2015 | Seo et al. |
| 2015/0075384 A1* | 3/2015 | Park ................... B01D 53/885 |
| | | 96/224 |

FOREIGN PATENT DOCUMENTS

| | | |
|---|---|---|
| CN | 107488579 A | 12/2017 |
| CN | 206725801 U | 12/2017 |
| CN | 207196175 U | 4/2018 |
| JP | 2001-269540 A | 10/2001 |
| JP | 2003-126227 A | 5/2003 |
| JP | 2006-237563 A | 9/2006 |
| JP | 2006-280428 A | 10/2006 |
| JP | 2010-092861 A | 4/2010 |
| JP | 2014-171572 A | 9/2014 |
| KR | 10-0938975 B | 1/2010 |
| KR | 10-2010-0108962 A | 10/2010 |
| KR | 10-1459071 B1 | 11/2014 |
| KR | 10-2015-0002366 A | 1/2015 |
| KR | 10-2018-0090203 A | 8/2018 |
| KR | 10-2020-0036607 A | 4/2020 |
| WO | 2018-016116 A1 | 1/2018 |

OTHER PUBLICATIONS

Extended European Search Report issued in the corresponding European Patent Application No. 19900852.5 on Jul. 28, 2021, 7 pages.

* cited by examiner

[FIG. 1]
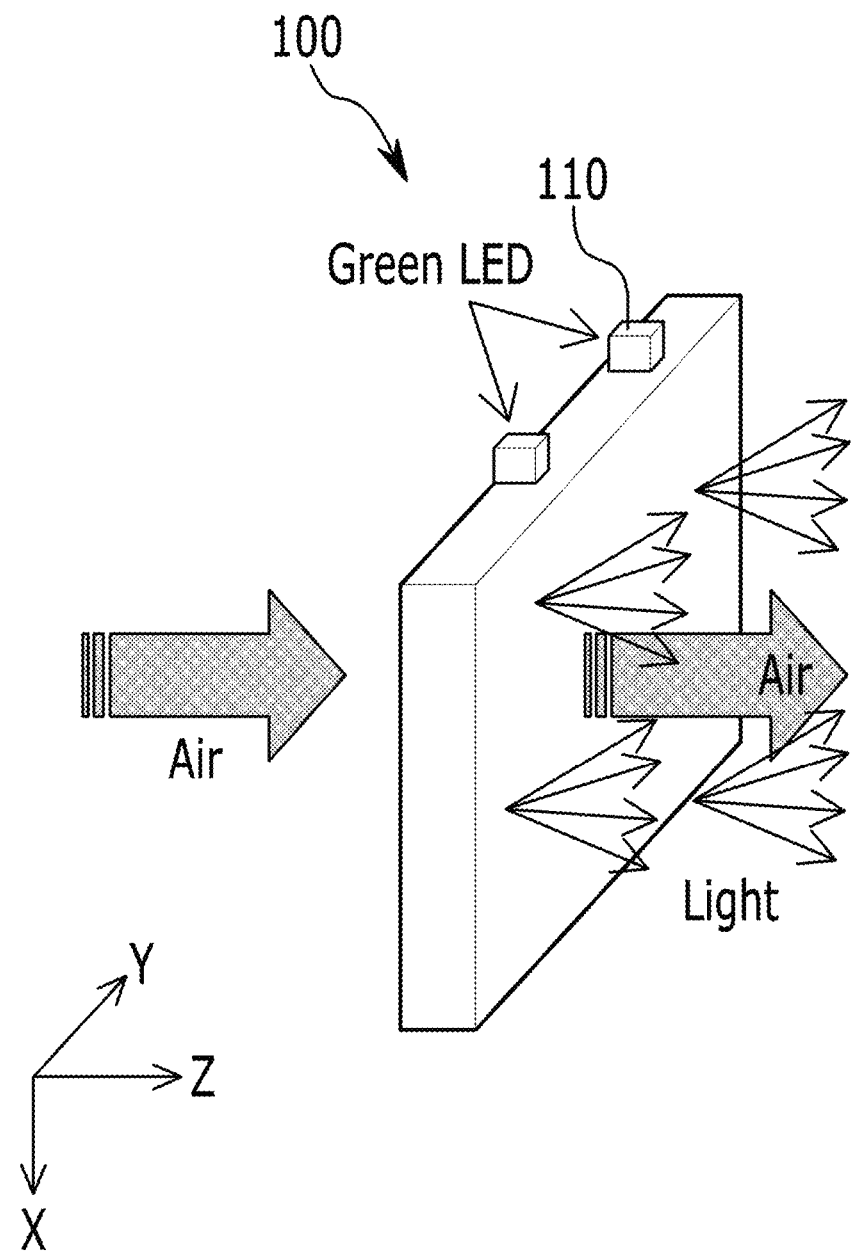

[FIG. 2]
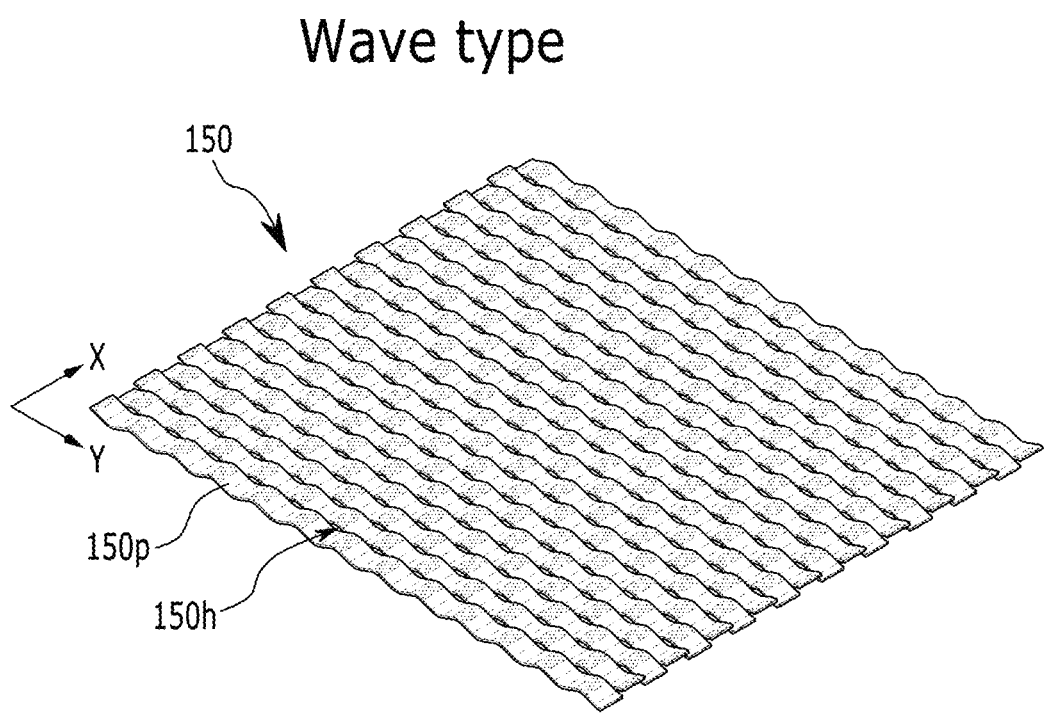

[FIG. 3]
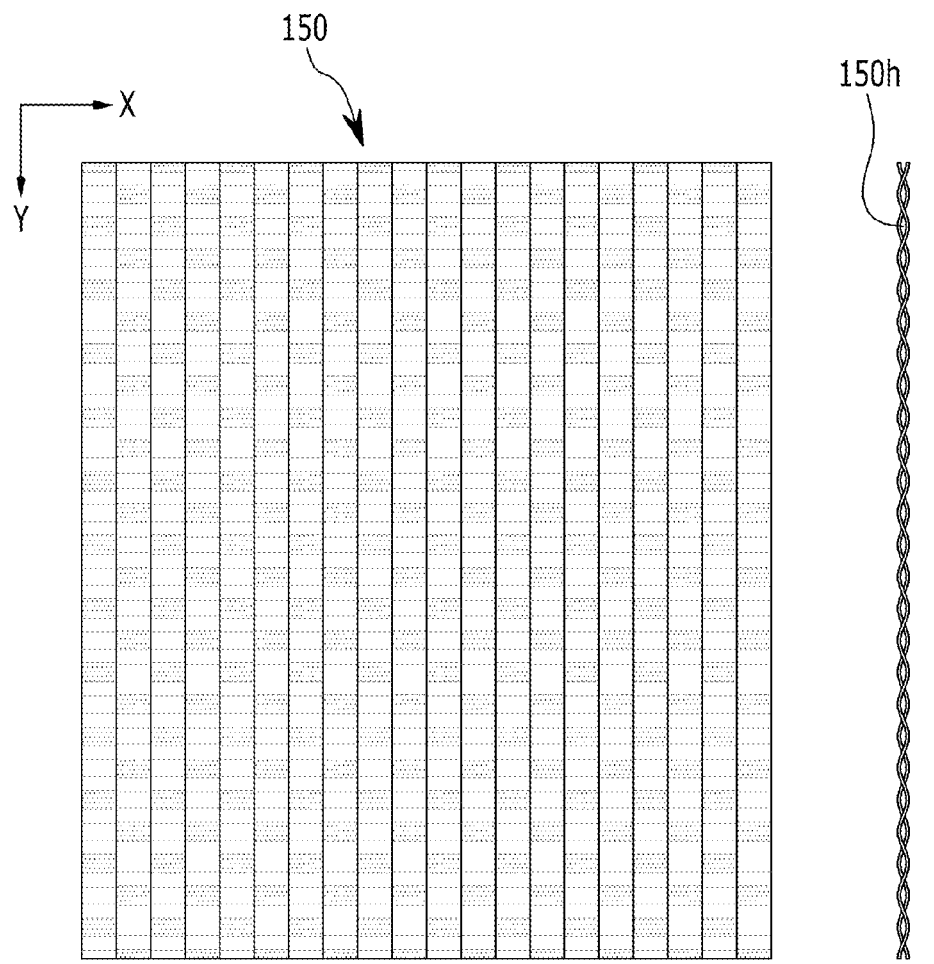
(a)
(b)
(c)

[FIG. 4]
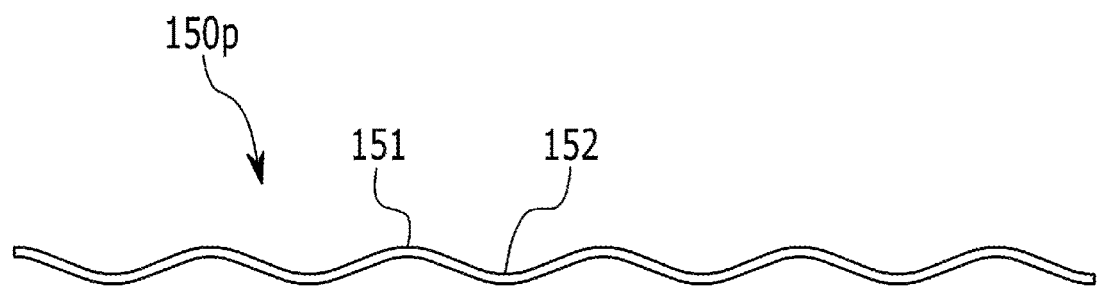

[FIG. 5]
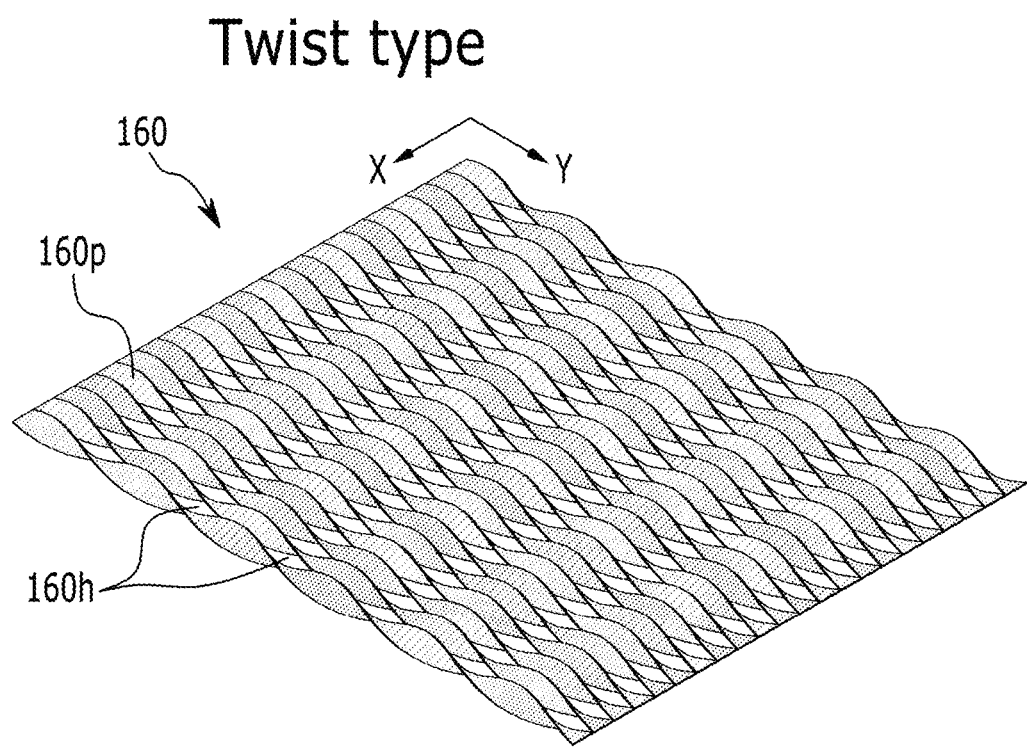

[FIG. 6]
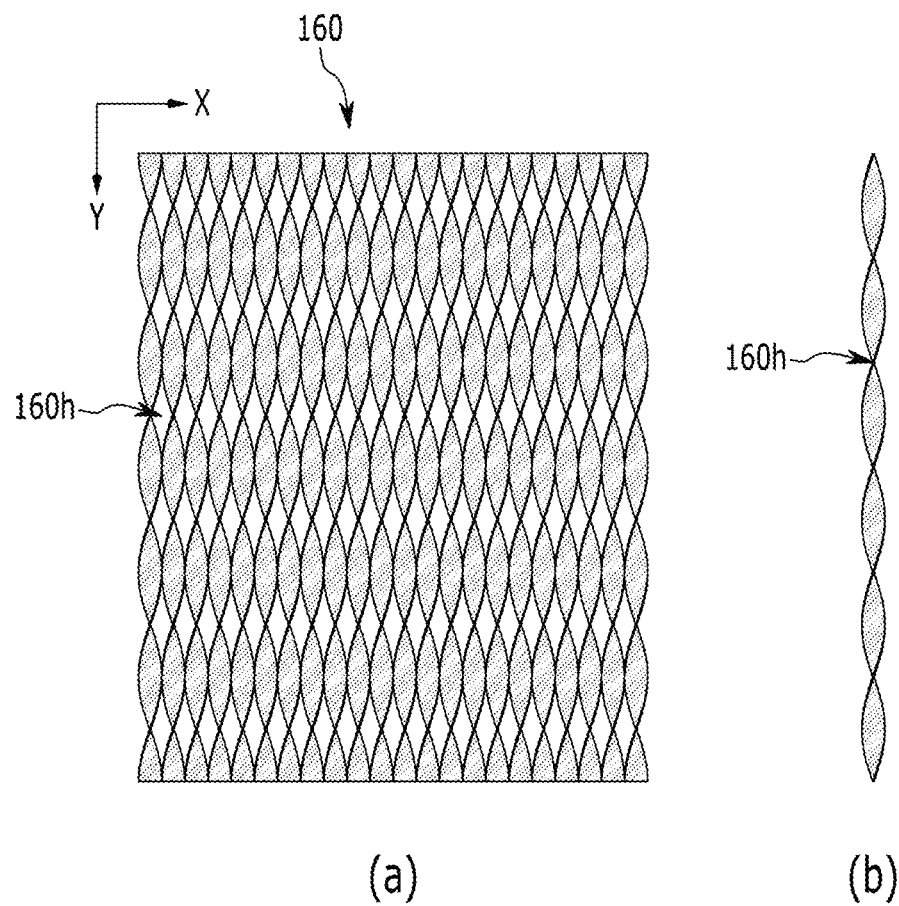

[FIG. 7]
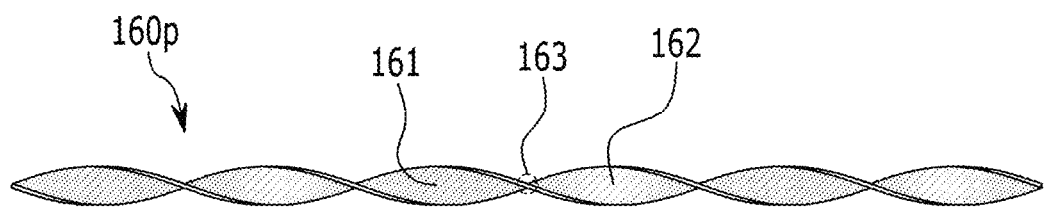

[FIG. 8]
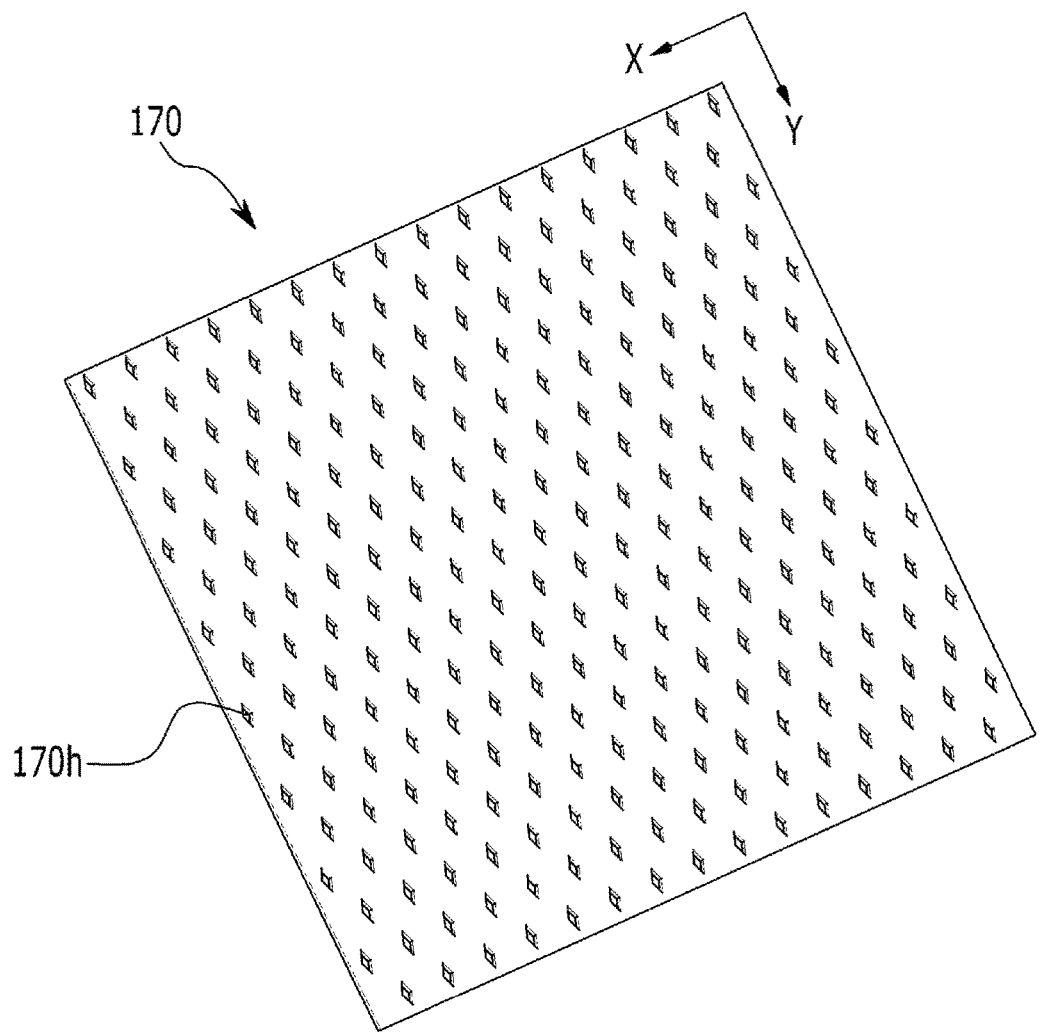

[FIG. 9]
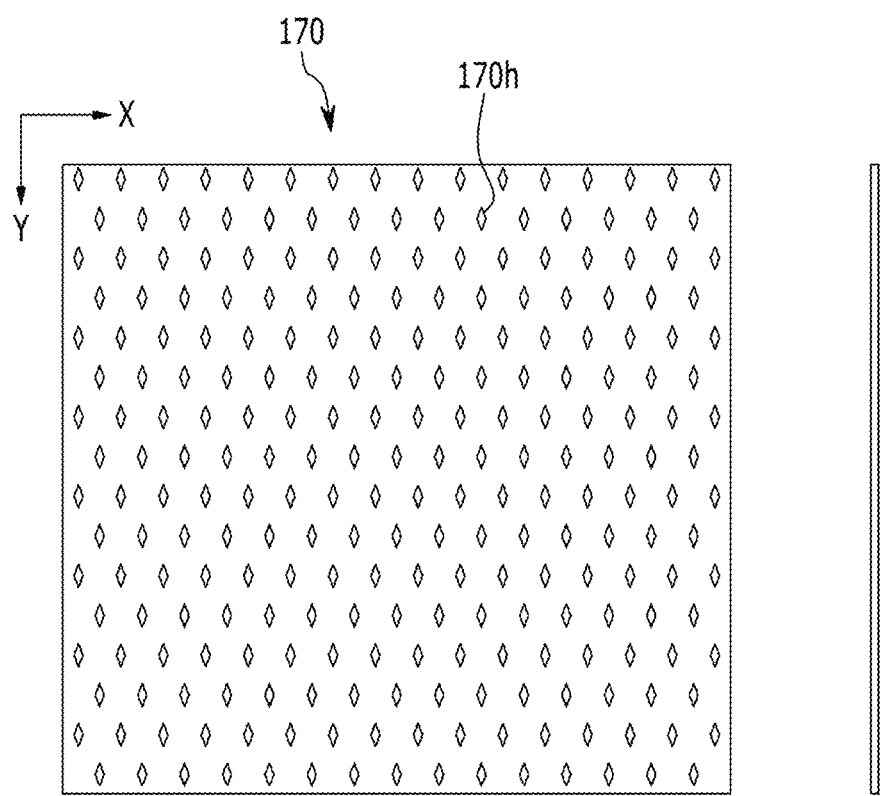
(a)
(b)
(c)

[FIG. 10]
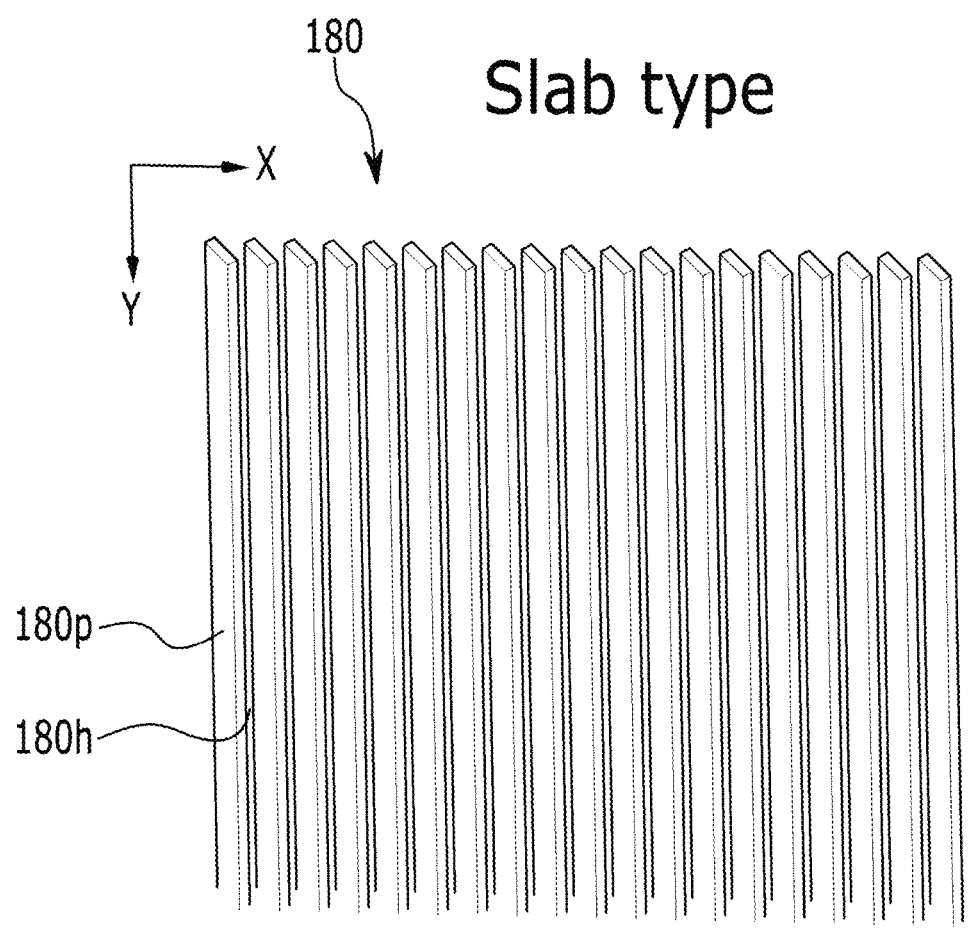

[FIG. 11]
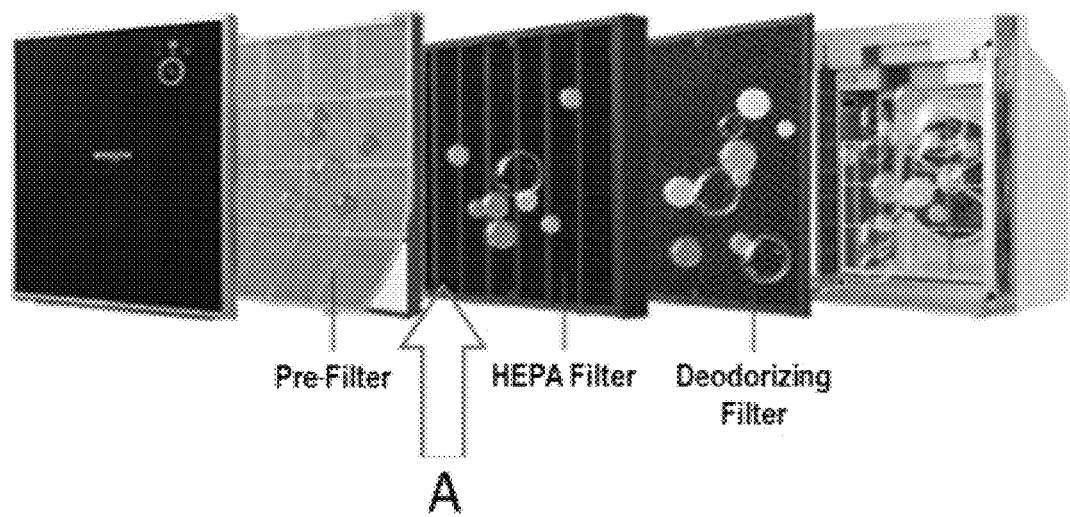

[FIG. 12]
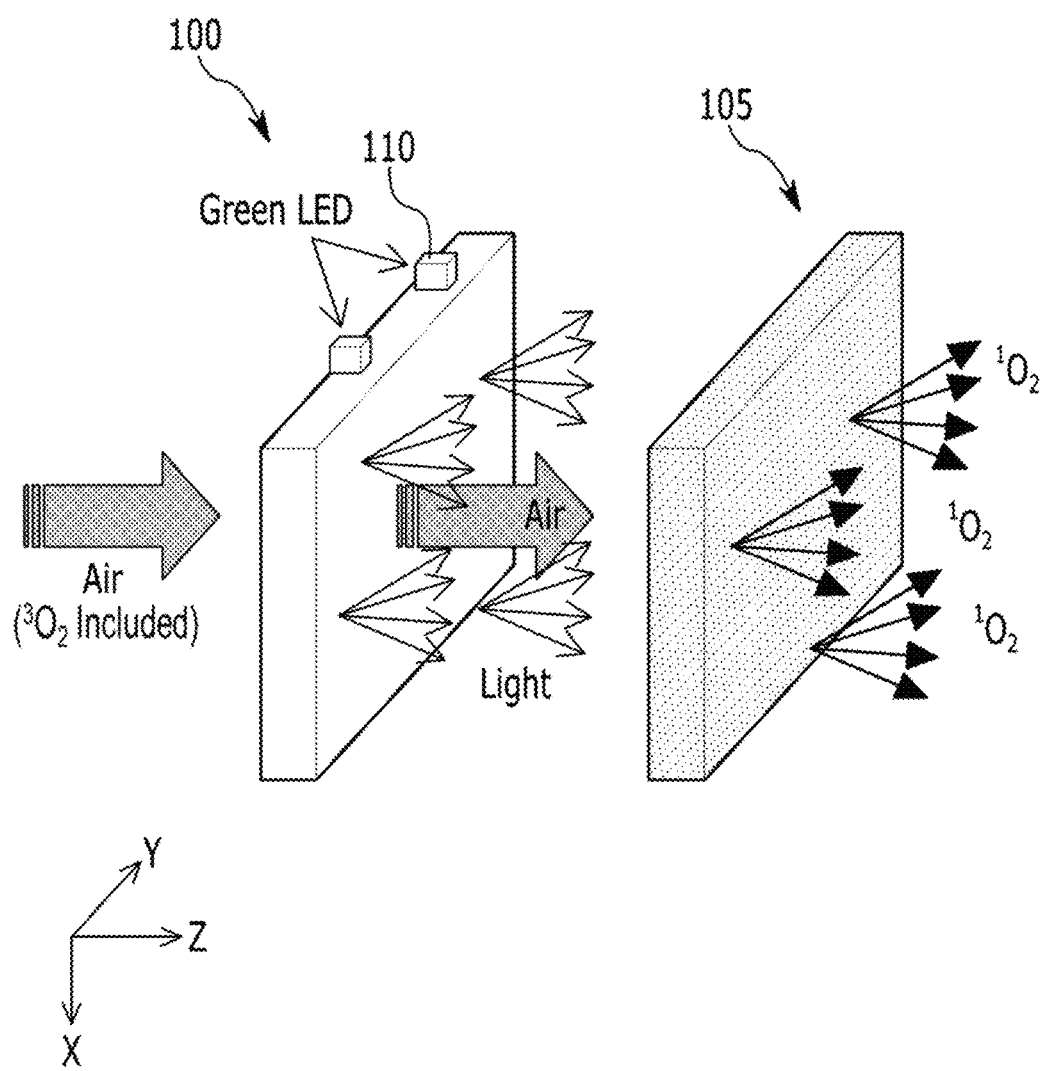

[FIG. 13]
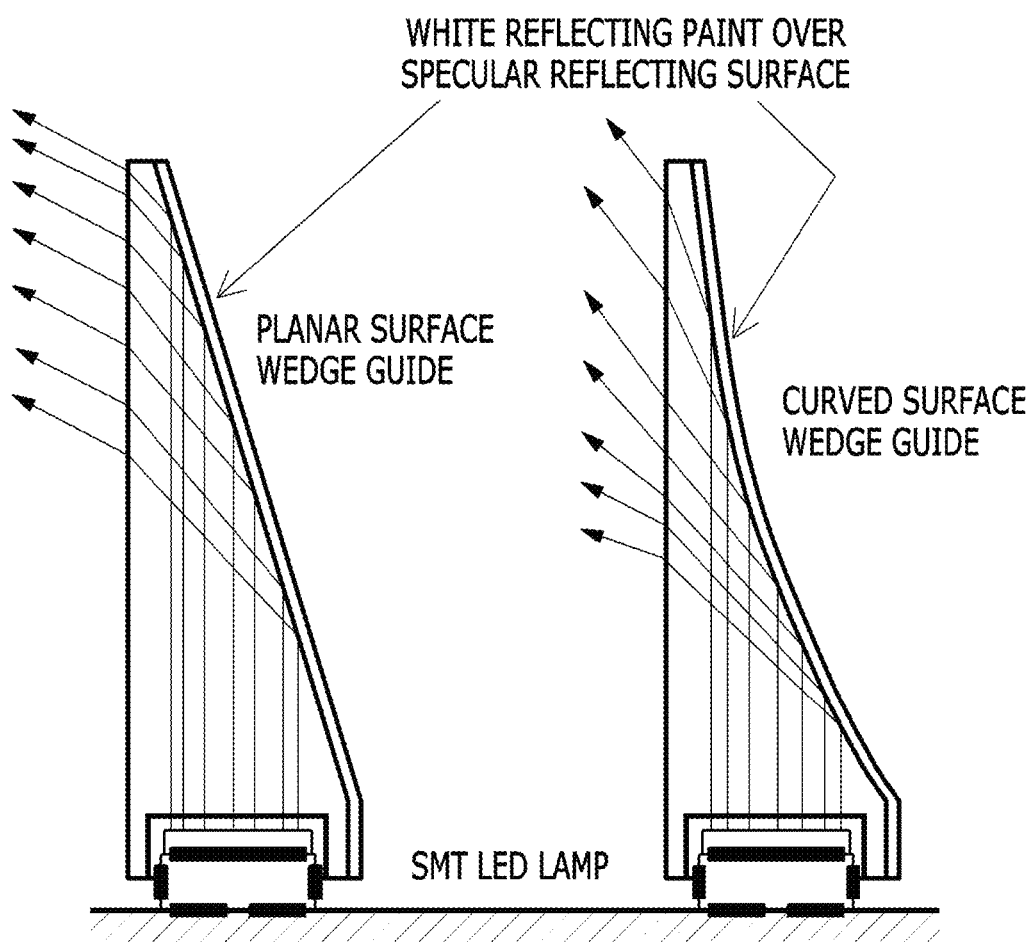

[FIG. 14]
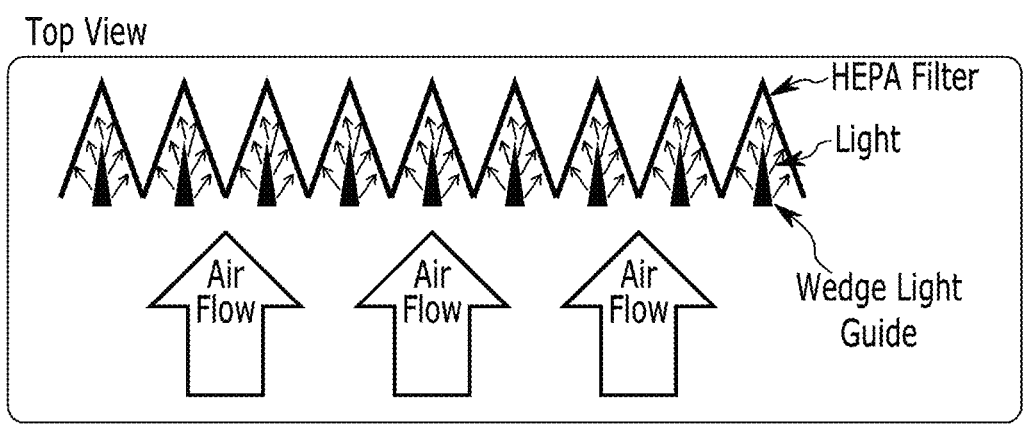

LIGHT GUIDE PLATE HAVING AIR PERMEABILITY AND AIR PURIFYING FILTER INCLUDING THE SAME

TECHNICAL FIELD

Cross Citation with Related Application(s)

This application is a 35 U.S.C. 371 National Phase Entry Application from PCT/KR2019/014994, filed on Nov. 6, 2019 and designating the United States, which claims the benefit of Korean Patent Application No. 10-2018-0166729 filed on Dec. 20, 2018 with the Korean Intellectual Property Office, the disclosure of which are incorporated herein by reference in their entirety.

The present disclosure relates to an air-permeable light guide plate and an air purifying filter including the same, and more particularly, to an air-permeable light guide plate through which air passes and simultaneously emits light, and an air purifying filter including the same.

BACKGROUND OF THE INVENTION

In recent years, due to urbanization and changes in industrial structure, the popularity of those spending most of the day in a tightly closed space, such as an office, an underground station, a vehicle, and the like, is increasing. As such, it is well known that modern people have no choice but to live in trapped air, and indoor air can become contaminated due to dust or harmful compounds generated from construction materials, furniture, wallpaper, electronic products, etc., but the interest of private and public transportation vehicles has recently increased dramatically.

Therefore, in order to address the above pollution problem, ventilation or filter-type air purifiers and the like are being used, but they cannot completely remove odor, bacteria, volatile harmful substances and the like.

In order to complement this problem, various attempts have been made to remove volatile harmful substances or to implement an antibacterial function by irradiating light to a photocatalyst or a photosensitive agent. As an example, Korean Patent Registration No. 10-0938975 discloses an air purifying apparatus using a photocatalyst filter of air.

In general, in an air purifier or an air conditioner, a plurality of filters having a flat plate structure may be used to reduce volume. It is preferable that the photocatalyst or photosensitive agent is attached to the filter or forms a separate thin plate structure. In order to uniformly illuminate the photocatalyst or the photosensitive agent and reduce the volume of a product, it is preferable to use a surface light source, but when an existing surface light source is inserted between the filters, the flow of air is blocked, and thus the normal operation of the air purifier or the air conditioner is made difficult.

BRIEF SUMMARY OF THE INVENTION

The problem to be solved by the present disclosure is directed to provide an air-permeable light guide plate through which air passes and simultaneously emits light, and an air purifying filter including the same.

However, the problem to be solved by the embodiments of the present disclosure is not limited to the above-described problems, and can be variously expanded within the scope of the technical idea included in the present disclosure.

According to an embodiment of the present disclosure, there is provided an air-permeable light guide plate comprising: a light source located on at least one side surface, and a flat type plate through which light generated from the light source passes, wherein light is emitted in a direction perpendicular to a flat plate of the flat type plate, and the flat type plate has a plurality of openings.

The flat type plate may have one of a wave structure, a twisted structure, and a punch structure to form the plurality of openings.

The flat type plate may include a plurality of pattern parts, and the pattern parts may have a wave shape or a twist shape.

In the flat type plate including the pattern part having the wave shape, the wave shapes of mutually adjacent pattern parts may be alternately arranged to form the openings.

In the flat type plate including the pattern part having the twist shape, the twist shapes of mutually adjacent pattern parts may be arranged side by side to form the openings.

The flat type plate having the punch structure may have a porous structure.

A light reflecting material may be coated on the flat type plate.

The light reflecting material may include titanium dioxide or aluminum oxide.

In an air purifying filter according to another embodiment of the present disclosure, the air-permeable light guide plate described above is located between a pre-filter and a HEPA filter.

Light may proceed from the air-permeable light guide plate to the HEPA filter.

The air purifying filter may further include a support layer located between the flat type plate and the HEPA filter.

A plurality of light guide patterns are formed in a wedge form on a surface where light is emitted from the flat type plate included in the air-permeable light guide plate, and each of the plurality of light guide patterns may be located corresponding to a folded part of the HEPA filter.

Advantageous Effects

According to embodiments, by forming an opening through which air can pass, and having a light guiding pattern capable of sending uniform light to a front surface, it is possible to implement an air-permeable light guide plate that irradiates light to a photocatalyst or photosensitive agent so as to remove volatile harmful substances or implement an antibacterial function in an air purifying filter.

BRIEF DESCRIPTION OF THE DRAWINGS

FIG. 1 is a perspective view illustrating an air-permeable light guide plate according to an embodiment of the present disclosure.

FIG. 2 is a perspective view illustrating a flat type plate included in an air-permeable light guide plate according to an embodiment of the present disclosure.

FIG. 3 is a view of the air-permeable light guide plate of FIG. 2 viewed from various directions.

FIG. 4 is a view illustrating a pattern part that configures the flat type plate of FIG. 2 and FIG. 3.

FIG. 5 is a perspective view illustrating a flat type plate included in an air-permeable light guide plate according to another embodiment of the present disclosure.

FIG. 6 is a view of the air-permeable light guide plate of FIG. 5 viewed from various directions.

FIG. 7 is a view illustrating a pattern part configuring the flat type plate of FIG. 5 and FIG. 6.

FIG. 8 is a perspective view illustrating a flat type plate included in an air-permeable light guide plate according to another embodiment of the present disclosure.

FIG. 9 is a view of the air-permeable light guide plate of FIG. 8 viewed from various directions.

FIG. 10 is a perspective view illustrating a flat type plate included in an air-permeable light guide plate according to another embodiment of the present disclosure.

FIG. 11 is a perspective view illustrating the air-permeable light guide plate according to the embodiment of FIG. 1 being disposed in an air purifying filter.

FIG. 12 is a perspective view illustrating a support layer formed to adjoin an air-permeable light guide plate according to another embodiment of the present disclosure.

FIG. 13 is a side view of an air-permeable light guide plate according to another embodiment of the present disclosure.

FIG. 14 is a plan view of the air-permeable light guide plate of FIG. 13.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a part is referred to as "including" a certain component, it means that it can further include other components, without excluding the other components, unless otherwise stated.

FIG. 1 is a perspective view illustrating an air-permeable light guide plate according to an embodiment of the present disclosure.

Referring to FIG. 1, an air-permeable light guide plate 100 according to an embodiment of the present disclosure includes a flat type plate extending in a direction perpendicular to a direction in which air passes, and a light source 110 located on at least one side surface of the flat type plate. In FIG. 1, the light source 110 is illustrated as being located on one side surface, but in addition to this, the light source 110 may be additionally formed on another side surface. The light source 110 may be a light emitting diode and one or more may be formed. The air-permeable light guide plate 100 according to the present embodiment may emit light generated from the light source 110 in a direction perpendicular to a flat plate of the flat type plate, and may have a plurality of openings to allow air to pass through at the same time. Although not shown, the air-permeable light guide plate 100 may include a module frame surrounding a flat type plate, and by using such a module frame, can absorb or reflect light so that light generated from the light source 110 can proceed in the Z-axis direction.

Hereinafter, a plurality of openings will be described in detail.

FIG. 2 is a perspective view illustrating a flat type plate included in an air-permeable light guide plate according to an embodiment of the present disclosure. FIG. 3 is a view of the air-permeable light guide plate of FIG. 2 viewed from various directions. FIG. 4 is a view illustrating a pattern part that configures the flat type plate of FIG. 2 and FIG. 3.

Referring to FIG. 2, the air-permeable light guide plate according to the present embodiment may include a flat type plate 150 having a wave structure to form a plurality of openings 150h. The flat type plate 150 includes a plurality of pattern parts 150p, and as shown in FIG. 4, a pattern part 150p has a wave shape, which is a shape formed by a first part 151 and a second part 152 being repeatedly connected, corresponding to a floor and a valley Ike a wave, In the present embodiment, the flat type plate 150 may be formed with openings 150h by alternately arranging wave shapes of mutually adjacent pattern parts 150p.

FIG. 3(a) corresponds to a plan view of the flat type plate 150 of FIG. 2 as viewed from the top, FIG. 3(b) is a view of FIG. 3(a) viewed in the X-axis direction, and FIG. 3(c) is a view of FIG. 3(a) viewed in the Y-axis direction.

Referring to FIG. 3(b) and FIG. 4, when the wave shapes of the pattern parts 150p adjacent to each other are alternately arranged, a first part 151 of one pattern part 150p among the mutually adjacent pattern parts 150p and a second part 152 of another pattern part 150p may overlap each other in the X-axis direction to form an opening 150h.

Referring to FIG. 3(a) and FIG. 3(c), when viewed in the Y-axis direction, the wave patterns of the plurality of pattern parts 150p are alternately arranged, and the upper and lower surfaces of the flat type plate 150 can appear to be flat.

FIG. 5 is a perspective view illustrating a flat type plate included in an air-permeable light guide plate according to another embodiment of the present disclosure. FIG. 6 is a view of the air-permeable light guide plate of FIG. 5 viewed from various directions, FIG. 7 is a view illustrating one pattern part configuring the flat type plate of FIG. 5 and FIG. 6.

Referring to FIG. 5, the air-permeable light guide plate according to the present embodiment may include a flat type plate 160 having a twisted structure to form a plurality of openings 160h. The flat type plate 160 includes a plurality of pattern parts 160p, and as shown in FIG. 7, a pattern part 160p has a twist shape. From a state wherein a pattern part 160p has a first surface and a second surface facing each other before being twisted, after being twisted, as shown in FIG. 7, it is a shape formed by a first surface of a first part 161 and a second surface of a second part 162 being repeatedly connected based on a twist point 163 on the same side surface.

In the present embodiment, the flat type plate 160 may be formed with openings 160h by arranging the twist shapes of mutually adjacent pattern parts 160p side by side, FIG. 6(a) corresponds to a plan view of the flat type plate 160 of FIG. 5 as viewed from the top, FIG. 6(b) is a view of FIG. 6(a) viewed in the X-axis direction, and FIG. 6(c) is a view of FIG. 6(a) viewed in the Y-axis direction.

Referring to FIG. 6(b) and FIG. 7, when the twist shapes of the pattern parts 160p adjacent to each other are arranged side by side, a first part 161 and a second part 162 of one pattern part 160p among the mutually adjacent pattern parts 160pm and a first part 161 and a second part 162 of another pattern part 160p may overlap each other in the X-axis direction, and a twist point 163 may also be located on a virtual line in the same X-axis direction. Accordingly, due to the twist shape, an opening 160h can be formed, which is a space between the twist points 163 of pattern parts 160p adjacent to each other in the Y-axis direction.

Referring to FIG. 6(a) and FIG. 6(c), when viewed in the Y-axis direction, the twist shapes of the plurality of pattern parts 160p are arranged side by side, and the upper and lower surfaces of the flat type plate 160 can form a wave shape.

FIG. 8 is a perspective view illustrating a flat type plate included in an air-permeable light guide plate according to another embodiment of the present disclosure. FIG. 9 is a view of the air-permeable light guide plate of FIG. 8 viewed from various directions.

Referring to FIG. 8, the air-permeable light guide plate according to the present embodiment may include a flat type plate 170 having a punch structure to form a plurality of openings 170h. The flat type plate 170 may have a porous structure in which an opening 170h is formed.

FIG. 9(a) corresponds to a plan view of the flat type plate 170 of FIG. 8 as viewed from the top, and FIG. 9(b) is a view of FIG. 9(a) in the X-axis direction, and FIG. 9(c) is a view of FIG. 9(a) viewed in the Y-axis direction.

Referring to FIG. 9(b) and FIG. 9(c), in the present embodiment, since the opening 170h may be formed by drilling a plurality of holes in a flat type plate 170 to allow air to pass via a punching process, the opening 170h cannot be seen when viewed in the X-axis and Y-axis directions, and the upper and lower surfaces of the flat type plate 170 can appear to be flat.

FIG. 10 is a perspective view illustrating a flat type plate included in an air-permeable light guide plate according to another embodiment of the present disclosure.

Referring to FIG. 10, the air-permeable light guide plate according to the present embodiment may include a flat type plate 180 consisting of a plurality of slabs 180p to form a plurality of openings 180h. The plurality of slabs 180p may be tilted based on the Z-axis direction of FIG. 1, which is a direction through which light and air pass.

The flat type plates 150, 160, 170, and 180 described with reference to FIGS. 2 to 10 may be transparent acrylic panels made of PMMA (poly methyl meth acrylate) resin.

The flat type plates 150, 160, 170, and 180 may be coated with a light reflecting material, The light reflecting material may include titanium dioxide ($TiO_2$) or aluminum oxide ($Al_2O_3$), and the light generated from the light source 110 may be emitted in a direction perpendicular to the flat plate of the flat type plate by the light reflecting material coated on the flat type plates 150, 160, 170, and 180, The light reflecting material may be printed on the flat type plates 150, 160, 170, and 180 in the form of dots, and the size of a dot may be increased as the distance from the light source 110 increases, The dot shape may be implemented by scratching the mold of the flat type plates 150, 160, 170, and 180 with a laser or the like.

However, the same effect as coating the light reflecting material may be obtained by using refraction, reflection and/or diffusion of light via pattern design of the flat type plates 150, 160, 170, and 180, without coating the light-reflecting material.

FIG. 11 is a perspective view illustrating the air-permeable light guide plate according to the embodiment of FIG. 1 being disposed in an air purifying filter.

Referring to FIG. 11, in the air purifying filter according to the present embodiment, the air-permeable light guide plate described above may be disposed in the "A" part between the pre-filter and the HEPA filter, The location of the air-permeable light guide plate illustrated in FIG. 11 is one example, and the air-permeable light guide plate may be located on the side opposite to the part where the HEPA filter is located with respect to the pre-filter instead of between the pre-filter and the HEPA filter, and if the location is where light can be provided to the a photocatalyst or a photosensitive agent, an air-permeable light guide plate may be located on the side opposite to the part where the pre-filter is located with respect to the HEPA filter.

The pre-filter serves to filter out dust of approximately 10 micrometers or more, and the HEPA filter can function as a filter in the range of approximately 0.3 to 10 micrometers, The HEPA filter may include a part coated with a photocatalyst or a photosensitive agent. The light emitted from the air-permeable light guide plate may react with a photocatalyst or photosensitive agent formed in the HEPA filter to remove volatile harmful substances.

FIG. 12 is a perspective view illustrating a support layer formed to adjoin an air-permeable light guide plate according to another embodiment of the present disclosure.

Referring to FIG. 11 and FIG. 12, the air purifying filter according to the present exemplary embodiment may further include a support layer 105 between the air-permeable light guide plate 100 and the HEPA filter. The support layer 105 may serve as a support for the HEPA filter, but may also be coated with a photocatalyst or photosensitive agent. The support layer 105 may be formed of a mesh type to have air-permeability.

According to the embodiments of the present disclosure described above, it is possible to form an opening through which air can pass, and to have a light guiding pattern that can transmit uniform light toward a HEPA filter. At this time, if a diffusion pattern is applied in the structure of the light guide plate, only that portion of the diffusion pattern is broken and diffused, but in the present embodiment, uniform light can be transmitted by adjusting the density of the light guide pattern. Therefore, it is possible to implement a volatile harmful substance removal or antibacterial function in the air purifying filter.

FIG. 13 is a side view of an air-permeable light guide plate according to another embodiment of the present disclosure. FIG. 14 is a plan view of the air-permeable light guide plate of FIG. 13.

Referring to FIG. 13 and FIG. 14, a plurality of light guide patterns in a wedge shape are formed on a surface where light is emitted from the flat type plate included in the air-permeable light guide plate, and each of the plurality of light guide patterns may be located corresponding to a folded part of the HEPA filter.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: air-permeable light guide plate
150, 160, 170, 180: flat type plate
150h, 160h, 170h, 180h: opening
150p, 160p: pattern part
180p: slab

The invention claimed is:
1. An air-permeable light guide plate comprising,
a light source located on at least one side surface of the plate, and
a flat type plate through which light generated from the light source passes, wherein the light is emitted in a direction perpendicular to a flat plate of the flat type plate, and the flat type plate has a plurality of openings, and wherein the flat type plate has a wave structure or a twisted structure to form a plurality of openings.

2. The air-permeable light guide plate of claim 1, wherein the flat type plate comprises a plurality of pattern parts, and the pattern parts have a wave shape or a twist shape.

3. The air-permeable light guide plate of claim 2, wherein the flat type plate comprises the pattern parts having the wave shape, one pattern part and an adjacent pattern part are placed such that the wave shapes thereof are alternately arranged to form the openings.

4. The air-permeable light guide plate of claim 2, wherein the flat type plate comprises the pattern parts having the twist shape, and one pattern part and an adjacent pattern part are placed such that the twist shapes are arranged side by side to form the openings.

5. The air-permeable light guide plate of claim 1, wherein a light reflecting material is coated on the flat type plate.

6. The air-permeable light guide plate of claim 5, wherein the light reflecting material comprises titanium dioxide or aluminum oxide.

7. An air purifying filter comprising the air-permeable light guide plate of claim 1 and an HEPA filter.

8. The air purifying filter of claim 7, wherein light proceeds from the air-permeable light guide plate to the HEPA filter.

9. The air purifying filter of claim 7, further comprising a support layer located between the flat type plate and the HEPA filter.

10. The air purifying filter of claim 7, wherein a plurality of light guide patterns are formed in a wedge form on a surface where light is emitted from the flat type plate in the air-permeable light guide plate, and each of the plurality of light guide patterns is located to correspond to a folded part of the HEPA filter.

* * * * *